June 22, 1965   E. J. ALLPORT   3,190,385
DRIVE AND STEERING MECHANISM FOR WHEELED
VEHICLES OR IMPLEMENTS
Filed April 12, 1961   5 Sheets-Sheet 1
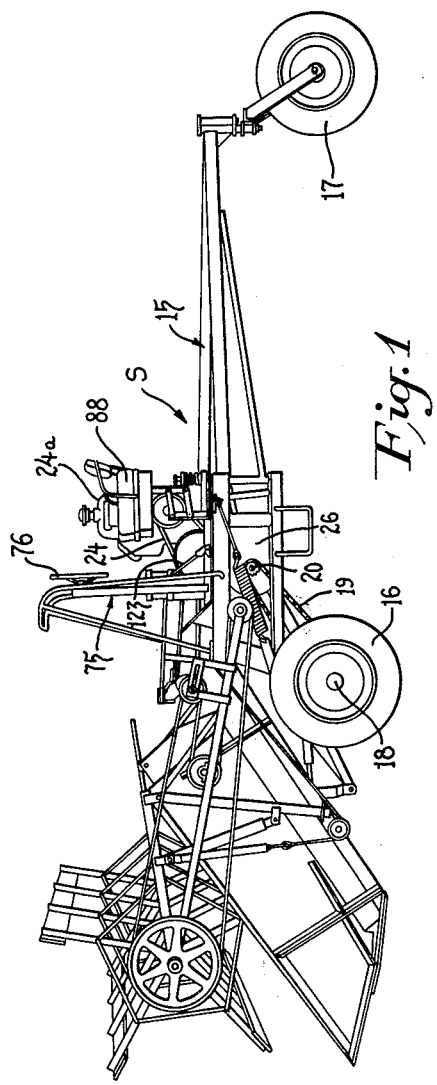
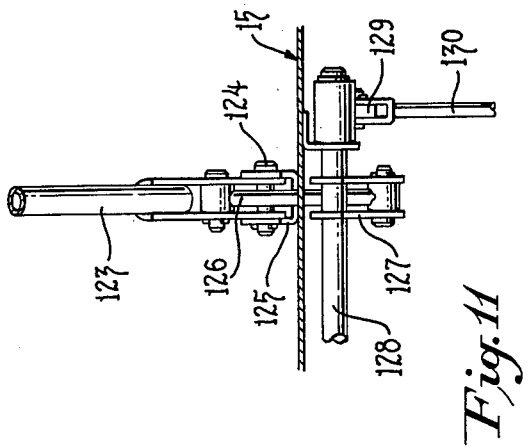
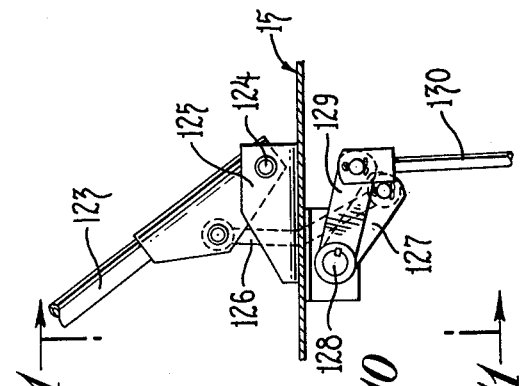
INVENTOR.
EDWARD JAMES ALLPORT
BY
Wolfe, Hubbard, Voit & Osann
ATTORNEYS.

June 22, 1965  E. J. ALLPORT  3,190,385
DRIVE AND STEERING MECHANISM FOR WHEELED
VEHICLES OR IMPLEMENTS
Filed April 12, 1961  5 Sheets-Sheet 2

INVENTOR.
EDWARD JAMES ALLPORT
BY
ATTORNEYS.

INVENTOR.
EDWARD JAMES ALLPORT

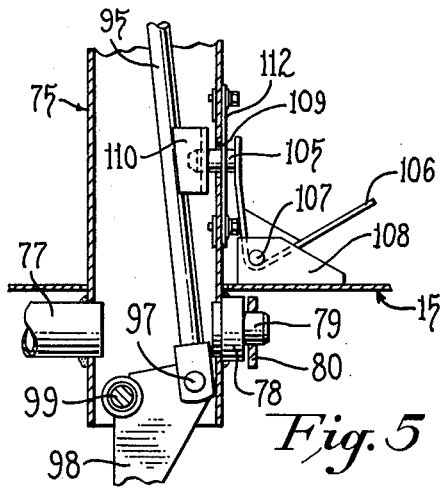
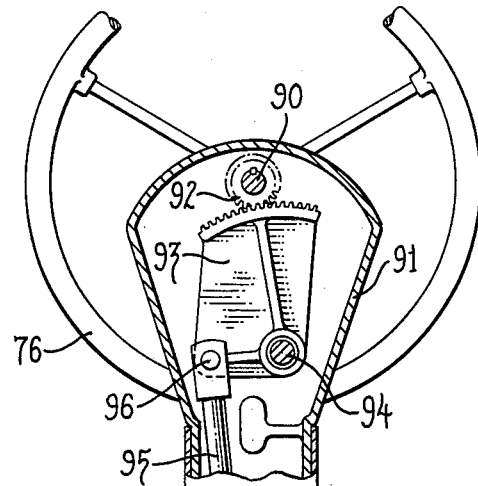
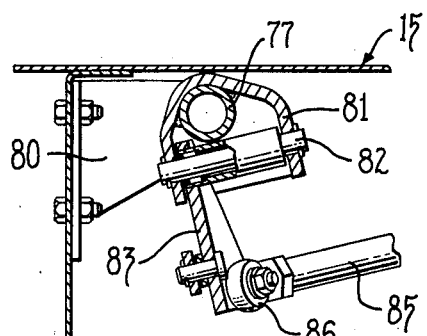
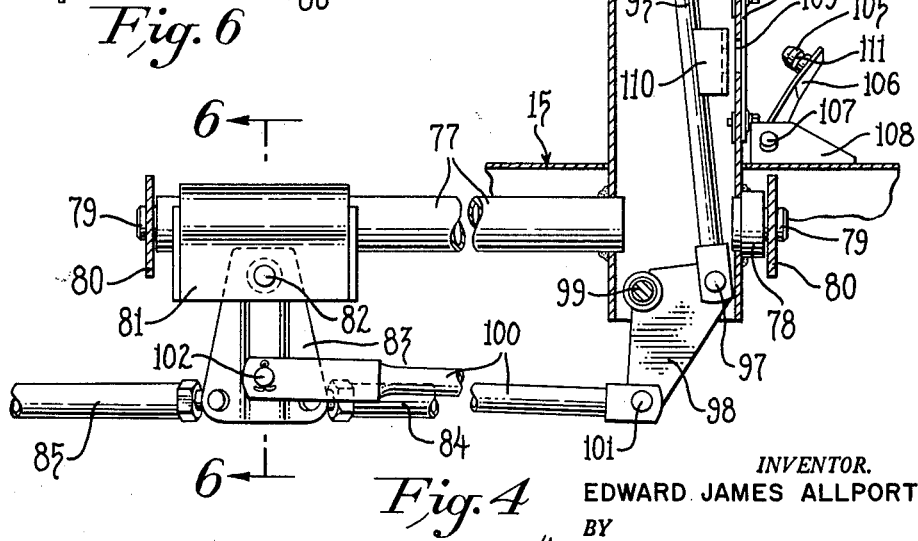

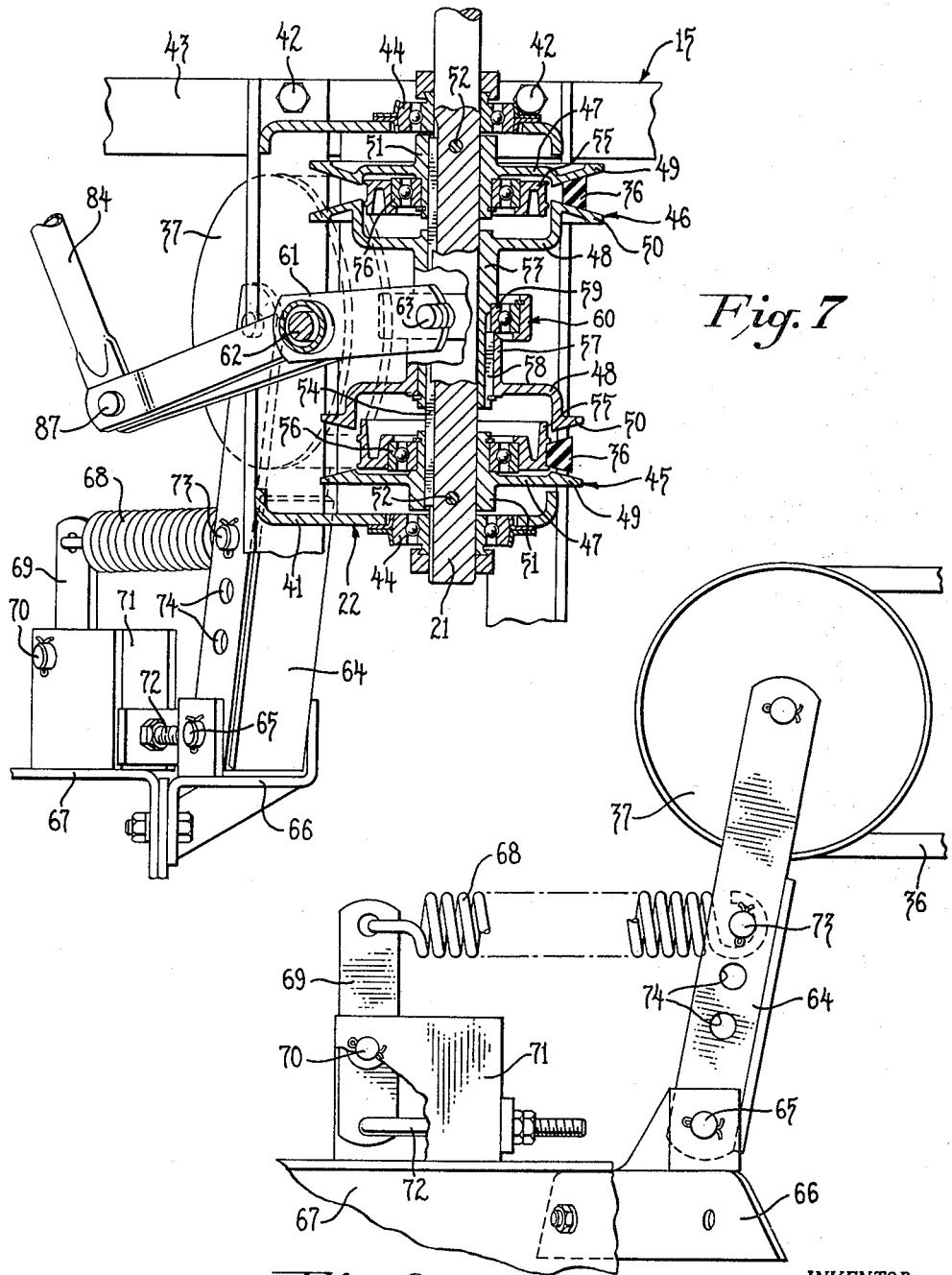

United States Patent Office 3,190,385
Patented June 22, 1965

3,190,385
DRIVE AND STEERING MECHANISM FOR WHEELED VEHICLES OR IMPLEMENTS
Edward James Allport, Cooksville, Ontario, Canada, assignor to Massey-Ferguson Limited, Toronto, Ontario, Canada, a corporation of Canada
Filed Apr. 12, 1961, Ser. No. 102,517
4 Claims. (Cl. 180—6.66)

The invention relates to self-propelled argicultural implements and more particularly to an improved belt drive transmission and steering mechanism for such implements.

Belt driving transmissions have been designed heretofore for use in lightweight agricultural implements as a means of reducing weight and lowering manufacturing costs. A transmission of that type is disclosed in the Johnson Patent, No. 2,930,246, issued March 29, 1960.

One object of the present invention is to simplify the construction of transmissions of the above general character to decrease their cost and to provide greater reliability and easier maintenance.

Another object is to provide a belt drive transmission embodying improved means of control which makes it much easier and more convenient to operate the implement and which particularly facilitates the starting, stopping and steering of the implement.

A more specific object is to provide a belt drive transmission for wheeled implements which affords a full range of control for forward, neutral and reverse drive and also for precise steering control which requires only two driving belts.

Another object is to provide a belt drive transmission embodying novel control means for engaging and disengaging the drive and for effectively locking the transmission against accidental or inadvertent engagement.

A further object is to provide an improved reversible variable speed transmission unit particularly suitable for driving wheeled agricultural implements.

Other objects and advantages of the invention will become apparent from the following detailed description of the preferred embodiment illustrated in the accompanying drawings in which FIGURE 1 is a side view of an implement equipped with a belt drive transmission and controls embodying the features of the invention.

FIG. 4 is a partly sectioned front view of the control column taken in a plane substantially on the line 4—4 of FIG. 2.

FIG. 5 is a fragmentary sectional view through the control column showing the transmission locked in neutral position.

FIG. 6 is a fragmentary sectional view taken in a plane substantially on the line 6—6 of FIG. 4.

FIG. 7 is a fragmentary sectional view through one of the transmission units taken in a plane substantially on the line 7—7 of FIG. 2.

FIG. 8 is a side elevational view of the idler pulley and mounting shown in FIG. 7.

FIG. 10 is a fragmentary sectional view taken in a plane substantially on the line 10—10 of FIG. 3.

FIG. 11 is a fragmentary sectional view taken in a plane substantially on the line 11—11 of FIG. 10.

While a preferred embodiment of the invention has been shown and will be described in detail herein, this is not intended to limit the invention to the particular form disclosed, the intention being to cover all modifiications and adaptations falling within the spirit and scope of the invention as more broadly or generally characterized in the appended claims.

For purposes of illustration, the invention has been shown as incorporated in an agricultural implement S of the type commonly known as a "swather," although it will be understood that it may be employed to advantage in other types of wheeled implements or vehicles in which lightness of weight and maneuverability are desired. The exemplary implement has a relatively wide frame structure 15 which at its front end carries suitable crop handling means. The frame structure is supported at opposite sides by left and right front wheels 16 and at the rear by a castering rear wheel 17 mounted on a rearwardly projecting portion of the frame.

Figure 3:
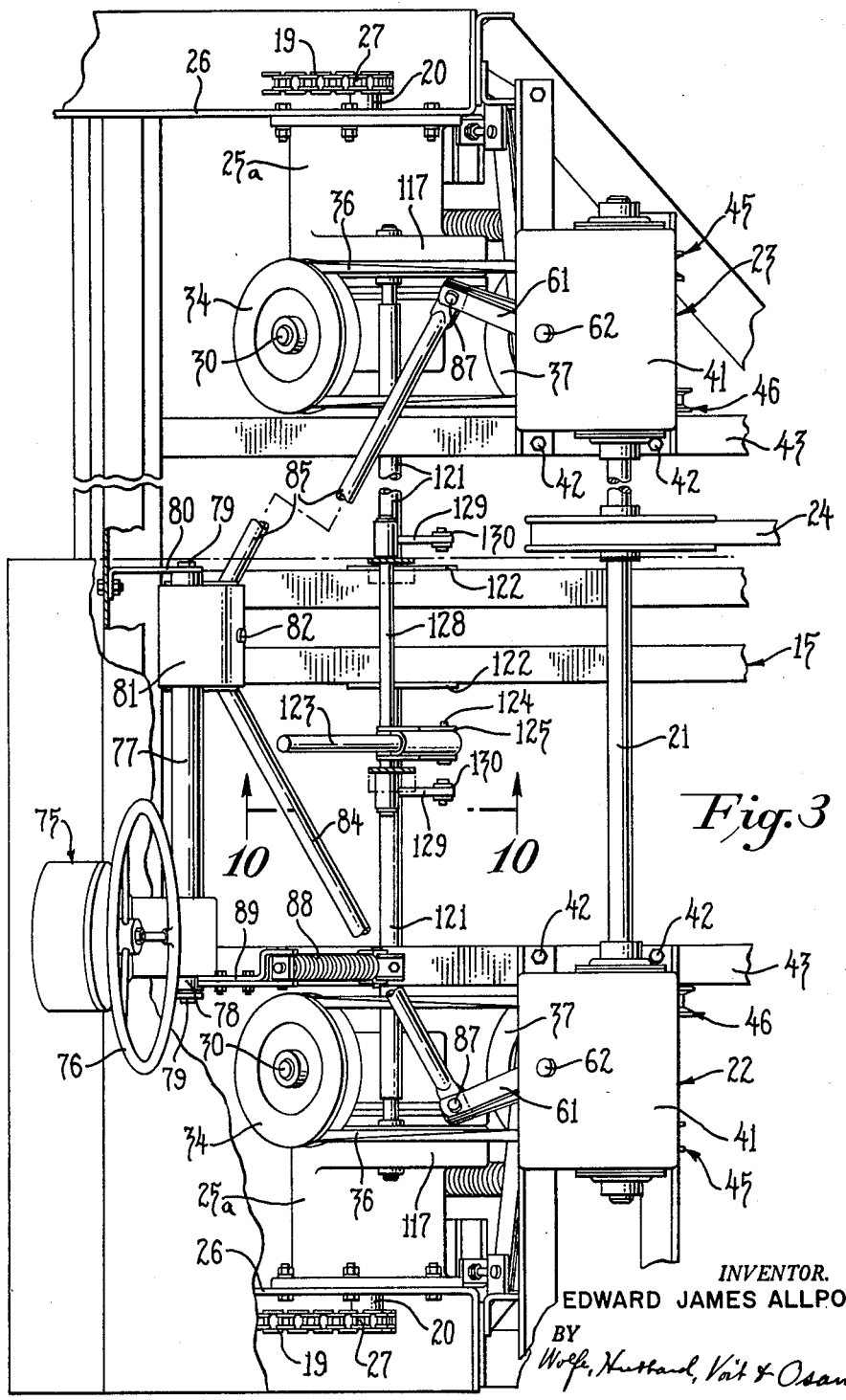
FIG. 3 is a fragmentary plan view of the implement with parts broken away to show details of the drive and control mechanisms.

The front wheels 16 are mounted on separate axles 18 suitably journaled on the implement frame and each axle is driven by a sprocket chain 19 from an individual intermediate drive shaft 20 constituting a part of the novel drive and steering means. The intermediate shafts 20 in turn are individually driven from an engine driven main drive shaft 21 through transmission units 22 and 23 embodying novel features of construction by which the direction of rotation of the intermediate shafts and, to a limited extent, their rotative speed, may be easily and precisely controlled. As shown in FIG. 3, the main shaft 21 extends transversely across the implement frame 15 and it is rotatably supported thereon, as will appear presently. It is driven in this instance by a V-belt 24 from an engine 25 carried on the implement frame as shown in FIG. 1. Preferably, the pulley 24 and the companion pulley on the engine shaft are of the variable pitch type and suitable controls are provided for simultaneously adjusting their effective pitch for regulating the speed of the drive shaft 21 and thus determining the speed of travel of the implement or vehicle over the ground.

The intermediate drive shafts 20 and their mountings are alike. Thus, each shaft is journalled in a housing 25a (FIGS. 2 and 3) bolted, in this instance, to an upright member 26 of the implement frame. The housings are positioned so as to locate the shafts 20 parallel to and spaced rearwardly of the respective axles 18. The outer ends of the intermediate shafts project from their housings and carry sprocket wheels 27 over which the drive chains 19 are trained, the chains also being trained over sprocket wheels on the respective axles.

Figure 9:
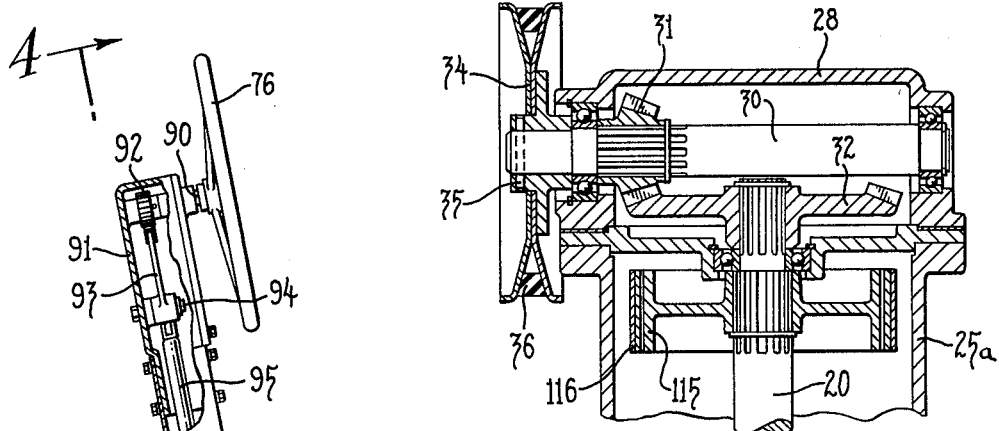
FIG. 9 is a fragmentary sectional view taken in a plane substantially on the line 9—9 of FIG. 2.

As shown in FIG. 9 of the drawings, the inner end of each shaft 20 extends from the housing 25a into a gear casing 28 which rotatably supports a shaft 30 with its axis transverse to that of the shaft 20. A beveled pinion 31 splined to the shaft 30 meshes with a beveled gear 32 splined to the shaft 20 to provide a driving connection to the latter shaft. One end of the shaft 30, in this instance, its upper end, projects from the casing 28 and carries a sheave or V-pulley 34 which is nonrotatably fixed to the shaft as by a pin 35. The pulley 34 constitutes the drive pulley through which the intermediate shaft is driven from its associated transmission unit.

In accordance with one aspect of the invention, the transmission units 21 and 22 are constructed and arranged so that the drive for both shafts can be disengaged or the units can be conditioned to drive their respective intermediate shafts in either direction through a single V-belt 36 trained over the pulley 34 and over an idler pulley 37. The two pulleys are disposed to engage opposite bights of the belt and thus direct the intermediate reaches through the associated transmission unit as will appear presently.

If desired, the transmission may be conditioned to provide variable speed ranges in both forward and reverse drive for supplementing or as a substitute for the variable main shaft drive.

The transmission units 22 and 23 are structurally similar and a description of one will therefore suffice. Referring to the sectional view of the transmission unit 22 as shown in FIG. 7, the unit includes a housing 41 supported on the implement frame structure 15 and secured as by bolts 42 to a longitudinal member 43 of the frame. The housings 41 of the units 22 and 23 are alined transversely of the frame and fitted with anti-friction bearings 44 journaling the main drive shaft 21. As shown in FIG. 7, each housing carries two of the bearings engaging the shaft at points spaced apart axially of the shaft.

Mounted on the shaft 21 within the housing 41 are a pair of drive pulleys, namely, a forward drive pulley 46 and a reverse drive pulley 45 adapted to cooperate with opposite reaches of the driving belt 36 as shown in FIG. 7. The pulleys are generally similar to the conventional variable pitch cone type pulley, although, as shown, pulley 45 provides only limited speed variation while pulley 46 has only drive and release position. In their preferred form, each pulley comprises a pair of members 47 and 48 mounted on and rotatable with the drive shaft 21. The members are formed with oppositely inclined peripheral flanges 49 and 50 which cooperate to form a groove for the belt 36, the effective width of which is adjustable to either grip or release the belt 36. For this purpose, one of the pulley members, in this case, the member 47, has an integral hub 51 restrained against axial movement relative to the shaft as by a pin 52. The other pulley member 48 is mounted on or formed integrally with a sleeve 53 slidable axially of the shaft 21 toward or from the companion member 47. Both members of both pulleys 45 and 46 may be constrained to rotate with the shaft 21 by a key 54 which permits the sleeve carrying members 48 to move axially of the shaft.

The pulleys 45 and 46, as indicated above, are constructed and arranged so that they may be adjusted to completely release the belt 36 from driving engagement with the pulley flanges. This, of course, interrupts the drive to the intermediate shafts and thus constitutes the neutral position of the drive mechanism. To support the belt when so released, each pulley has associated with it an idler or belt supporting pulley 55 disposed in alinement with the belt groove. In the preferred form shown, the supporting pulley is rotatably mounted by an anti-friction bearing 56 on the hub 51 of the pulley member 47. To afford clearance for the pulley 55, pulley member 48 is formed with a generally cup-shaped configuration as shown in FIG. 7.

In assembling the drive, opposite reaches of the belt 36 between the driven pulley 34 and the idler pulley 37 are trained respectively over the driving pulleys 45 and 46. Since the driving pulleys are fixed to the same shaft, they necessarily rotate in the same direction. It will be evident therefore that the pulley 34 and the intermediate shaft 20 which it drives can be rotated in either direction by adjusting one or the other of the transmission pulleys or driving the belt. Thus, when the pulley 46 is adjusted for driving the belt, the intermediate shaft is rotated in a direction to drive the implement forwardly. Under such conditions, the pulley 45 is adjusted to the non-driving position and the reach of the belt 36 which is trained over it therefore runs idly on the pulley 55 associated with that drive pulley. Conversely, when the pulley 45 is adjusted to belt driving condition, intermediate shaft 20 is rotated in a direction to drive the vehicle reversely— that is, backward. Under those conditions, the pulley 55 associated with the drive pulley 46 supports the idly running reach of the belt trained over the latter pulley.

To insure the proper sequence of operations of the pulleys 45 and 46 for starting, stopping, reversing and steering the implement or vehicle, the shaftable members 48 are constrained to move as a unit by the sleeve 53. In the particular embodiment illustrated, the pulley member 48 of the inner or reverse drive pulley is formed integrally with the sleeve. The corresponding member of the outer or forward drive pulley is formed with a hollow hub 57 dimensioned to telescope over the end portion of the sleeve which is reduced in diameter as shown in FIG. 7. A key 58 constrains the sleeve and pulley member to rotate together.

Figure 2:
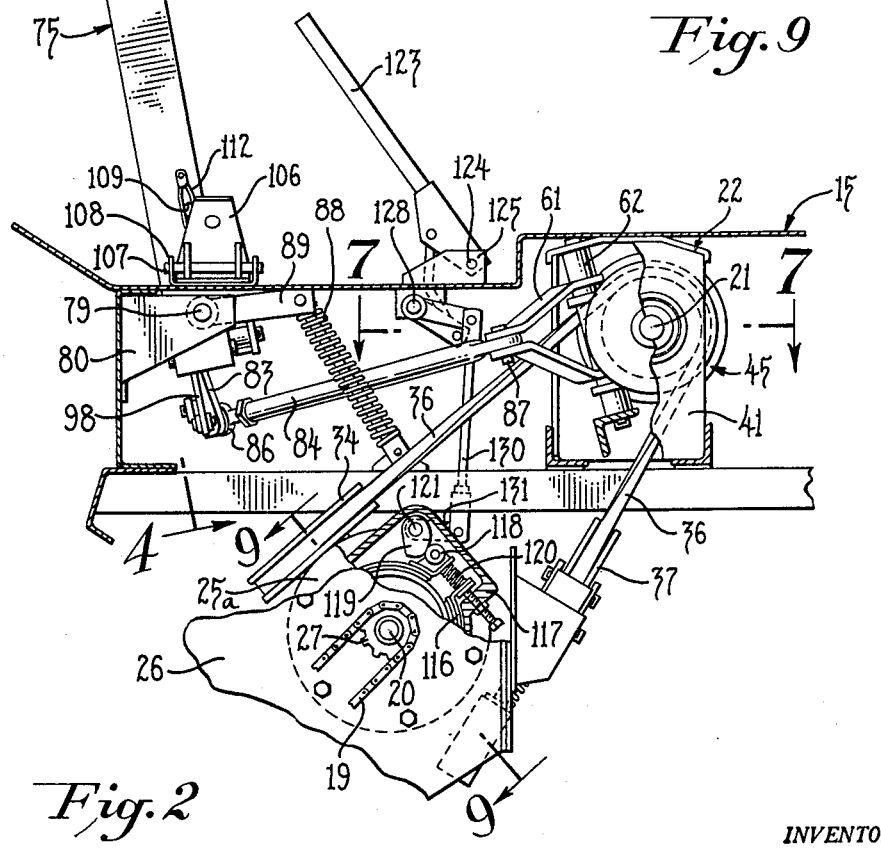
FIG. 2 is a fragmentary sectional view taken in a vertical plane substantially on the central axis of the implement.

The separable construction of the pulley member and sleeve as above described provides a peripheral groove in the sleeve for the reception of an inner race ring 59 of the anti-friction bearing 60 constituting a shifter ring by which the pulley members may be shifted to determine the operation of the transmission unit. The mechanism for effecting such shifting includes a bell crank lever 61 pivotally mounted on a pin 62 to swing about an axis disposed transversely to and spaced laterally from the shaft 21 on which the pulley and sleeve assembly slides. As shown in FIG. 2 the pivot pin 62 is supported within the housing 41 of the transmission unit by suitable supporting members incorporated in the housing. One end of the lever 61 is forked and extended to straddle the shifter ring 60. Pins 63 (FIG. 7) projecting from the outer race of the shifter ring bearing engage in apertures in the forked ends of the lever to provide an operative connection whereby the ring and pulley and sleeve assembly may be shifted axially along the drive shaft 21 to selectively engage and disengage the drive pulleys 45 and 46.

Adjustment of the pulleys 45 or 46 between the engaged and disengaged positions results in a change in the over-all length of the belt path around the pulleys 34 and 35. To accommodate this change, the idler pulley 37 associated with each transmission is yieldingly supported. Support is provided in this instance by an arm 64 pivotally mounted as by a pin 65 on a bracket 66 bolted or otherwise secured to an element 67 of the implement frame structure adjacent the housing for the intermediate shaft 20 driven by the transmission. A heavy coil spring 68 connected between the arm 64 and an anchoring member 69 on the frame urges the arm and pulley 37 in a direction to apply tension to the belt 36. The anchoring member 69 preferably comprises a lever pivoted intermediate its ends by a pin 70 to a bracket 71 carried by the frame member 67. Spring 68 is hooked to one end of the lever and an adjustable draw bolt 72 connected between the other end of the lever and the bracket 71 holds the lever stationary and provides means for rocking it to adjust the tension applied by the spring to the idler pulley supporting arm. The spring tension exerted on the arm 64 may be further adjusted by changing the point at which the spring 68 is connected to the arm, such connection being effected by a pin 73 engageable in a selected one of three sets of holes 74 provided in the sides of the arm and progressively spaced from the pivotal axis of the arm.

In accordance with another aspect of the invention, unitary control means is provided for the transmissions which permits the driver of the implement or vehicle to control its direction of movement and to steer the vehicle with little effort and with a high degree of precision. The control means is particularly characterized by its simplicity, reliability and ease of operation. In the preferred form shown, it includes a control column 75 pivotally supported adjacent its lower end on the implement frame structure 15 to rock fore-and-aft about a transverse axis and operative incident to such rocking through suitable linkages to adjust the transmission units 22 and 23 for engaging and disengaging the drive and for determining the direction in which the implement is to be driven. The column 75 carries an independently operable steering element herein shown as a steering wheel 76 by which the relationship of the linkages to the column and transmission units may be varied to adjust the units differentially so as to impart different rotative speeds to the implement wheels 16 and thereby steer the implement while moving either forwardly or reversely.

Referring more particularly to FIGS. 2 and 4–6 of the drawings, the column 75 comprises an elongated metal tube of generally rectangular cross section. Welded to opposite sides of the column adjacent its lower end are long and short support members 77 and 78 carrying alined pins 79 which engage in apertures in laterally spaced members 80 of the frame to support the column for swinging in a fore-and-aft direction. Welded or otherwise rigidly secured to the member 77 is a U-shaped bracket 81 (FIGS. 4 and 6) which, by means of a transversely disposed pin 82, pivotally supports an arm 83 extending generally parallel to the column 75. The pivot pin 82 is positioned so that the arm 83 is constrained to rock fore-and-aft with the column but is capable of being rocked in a plane parallel to the pivotal axis of the column.

The arm 83 constitutes, in effect, an extension of the column 75 below its pivotal axis. Rigid links 84 and 85 connect the arm with the adjusting levers 61 of the transmission units 22 and 23. To accommodate swinging of the column 75, the connections between the links and the arm 83 are effected through ball and socket connectors 86 (FIG. 6) permitting universal pivoting movements of the links relative to the arm. The connections with the unit adjusting levers are effected by pivot pins 87.

As the implement will usually perform its operations when moving forwardly, it has been found convenient to bias the column 75 in a direction such as to adjust the transmission units for forward drive. The biasing is effected in this instance by means of a compression spring 88 (FIGS. 2 and 3) connected between the implement frame and a lever 89 fixed to the column 75 adjacent its pivotal axis and projecting rearwardly therefrom.

As will be seen by reference to FIG. 3 of the drawings, the column 75 and its associated elements are mounted on the implement frame so that the bracket 81 and arm 83 supported thereby are located precisely midway between the adjusting lever pivots of the transmission units 22 and 23 and substantially forwardly of those units. The transmission adjusting linkages are thus symmetrical and the transmission units 22 and 23 are accordingly adjusted to drive in the same direction as an incident to the rocking of the column 75 about its pivot.

In the particular linkage organization shown the parts are proportioned and related so that the shiftable members 48 of the drive pulleys 45 and 46 of both transmission units 22 and 23 are located in a central or neutral position when the column 75 is swung to a substantially upright position with the arm 83 in its normal, centered position as shown in FIG. 4. When the column 75 is rocked rearwardly, that is, when it is pulled toward the driver occupying the seat 88 provided on the implement, links 84 and 85 are shifted forwardly and the adjusting levers 61 of the transmission units are rocked in a direction to condition pulleys 45 of the transmission unit for driving. In other words, the members 47 and 48 of the pulleys 45 are moved closer together to position their flanges 49 and 50 for engagement with the reaches of the belt 36 trained over those pulleys. The belts are thus driven in a direction to drive the intermediate shafts and axles for imparting rearward movement to the implement.

When the column 75 is pushed in the opposite direction—that is, away from the driver, links 84 and 85 are placed under compression and act to shift the pulley members in a direction to release the belt reaches running over the pulleys 45 and engage the pulleys 46 for driving the belt reaches with which they cooperate. The forward drive for the implement wheels is thus engaged and the implement moves forward.

As long as the arm 83 is positioned normal to the pivotal axis of the column 75 the adjustments imparted to the transmission units 22 and 23 are precisely alike and the units drive the two implement wheels at exactly the same speeds. The implement thus moves in a straight line either forwardly or reversely as determined by the direction in which the column 75 is rocked. To steer the implement to the right or left, the arm 83 is rocked from its normal position to differentially adjust the transmission units. More specifically, the transmission units are adjusted to reduce the speed of the drive for the ground wheel at the side of the tractor toward which the turn is to be made while the drive for the ground wheel at the other side of the implement is increased in speed.

The mechanism for effecting the steering action includes the steering wheel 76 which, as shown in FIGS. 2 and 4, is fixed to the end of a shaft 90 rotatably supported in and projecting rearwardly from a cap member 91 removably mounted on the upper end of the control column 75. A pinion 92 keyed to the shaft 90 within the cap meshes with the teeth of a gear segment 93 pivotally supported in the cap 91 as by a stud 94. Rotation of the steering wheel rocks the segment gear on its pivot to impart endwise movements to a rigid link 95 which is connected to the gear eccentrically of the pivot as by a pin 96. The link 95 extends downwardly through the column 75 and its lower end is connected by a pin 97 to one arm of a bell crank lever 98 pivoted on a pin 99 adjacent the lower end of the column to swing about an axis parallel to the axis of the gear segment. Lever 98 is positioned so that its other end projects beyond the lower end of the column and a rigid link 100 connects it with the arm 83. As shown in FIG. 4, the link is connected to the bell crank lever 98 by a pin 101 and to the arm 83 by a pin 102.

The operation of the steering mechanism will be readily apparent. Thus, during forward travel when the wheel 76 is rotated in a direction to initiate a turn of the vehicle to the left, the movable elements of the pulley 46 of transmission unit 22 are adjusted to reduce the speed of the associated run of the left hand belt 36. At the same time, the movable element of the pulley 46 of the unit 23 is adjusted to increase the speed of the right hand belt 36. The right wheel 16 of the implement is thus positively driven at a higher speed while the left wheel is positively driven at a lower speed and the implement accordingly turns to the left in a full power turn. To execute a turn to the right, the steering wheel 76 is rotated in the opposite direction thereby adjusting unit 22 to accelerate its associated ground wheel 16 while the other ground wheel is decelerated at the unit 23. Precisely the same actions take place when the transmission units are adjusted for reverse drive, the differential adjustments, in that case, being imposed on the drive pulleys 45 of the two transmission units.

It will be evident that the column 75 and steering wheel 76 provide very simple and efficient means for controlling the movements of the implement. Engagement of the drive for either forward or reverse travel and for stopping is effected selectively by swinging the column fore-and-aft about its pivoted lower end. Steering is effected by simply rotating the hand wheel 76 in the direction in which it is desired to turn the implement. Moreover, if it is desired to turn more sharply than is accomplished by turning the steering wheel 76, it is merely necessary to ease the column back toward the driver. Whether turning to the right or the left this puts the decelerating transmission 22 or 23, as the case may be, into neutral thus stopping the corresponding wheel and causing the machine to pivot about it as a center, except for such momentary coasting as may occur. If the column is drawn still further toward the driver, the decelerating transmission is shifted into reverse while the other transmission continues in forward drive, thus causing the vehicle to pivot about an axis intermediate the wheels.

Means is provided for locking the drive mechanism in the "off" or "neutral" position with the transmission units 22 and 23 adjusted for driving the implement straight ahead. The locking means as shown in FIGS. 2, 4 and 5 comprises a locking pin 105 mounted at one end of a V-shaped metal strap 106 pivoted at its apex on the implement frame as by a pin 107 socketed in the upstanding side members of a bracket 108. The pivot of the strap is located so that it may be rocketed to a position to project the pin 105 through an aperture 109 in the side wall of the column 75 when the column is disposed in its neutral position. Additionally, the link 95 of the steering mechanism is fitted with a bracket 110 (FIG. 4) having an aperture adapted to register with the aperture 109 in the column when the steering mechanism is set to adjust the transmission units for straight ahead drive. Pin 105 is dimensioned to enter the aperture in the bracket as shown in FIG. 5 and thus lock both the column and the steering mechanism in neutral position. To release the controls for driving, it is only necessary for the operator to apply pressure to the end of the strap opposite the locking pin, such end being disposed generally horizontally and located within easy reach of the driver's foot.

Provision is made for preventing inadvertent or accidental withdrawal of the pin 105 from locking position. For this purpose the shank of the pin is formed with a groove 111 (FIG. 4) engageable by a hairpin shaped spring 112 (FIGS. 2 and 5) mounted on the column with its legs straddling the aperture 109. Exertion of substantial pressure on the projecting end of the strap 106 is therefore necessary to withdraw the pin and release the control and steering mechanisms for operation.

The invention also provides effective and reliable brake mechanism by which the implement may be stopped or held stationary when parked. The braking means as shown includes brake drums 115 splined on the intermediate shafts 20 as shown in FIG. 9. Each drum is encircled by a conventional brake band 116 which has one end anchored to an extension 117 of the housing 25 as shown in FIG. 2. The other end of the brake band is suitably retained in the housing extension and carries a follower roller 118 engageable with an actuating cam 119. Rotation of the cam anticlockwise from the "off" position in which it is shown in FIG. 2 tightens the band on the brake drum and thus frictionally resists rotation of the intermediate shafts and the wheel carrying axle coupled thereto. When the cam is rocked to "off" position a spring 120 interposed between the ends of the brake band expand it to release the brake.

In the exemplary embodiment the cams 119 are fixed on shafts 121, each of which has one end extending through and journaled in the housing extension 117 of one of the intermediate shaft housings. The shafts extend inwardly of the implement frame and are journaled at their inner ends on members 122 of the frame as shown in FIG. 3.

Manually operable means, in this instance, a hand lever 123, is provided for rocking the shaft 121 to engage or disengage the brakes. As shown in FIGS. 2, 10 and 11, the hand lever is pivotally mounted at its lower end by means of a pin 124 in a bracket 125 carried on the frame structure 15. A link 126 operatively connects the hand lever with a crank arm 127 rigid with a shaft 128 extending across the implement frame as shown in FIG. 3 and overlying the inner ends of the shafts 121. Crank arms 129 fixed to opposite ends of the shafts 128 are connected by links 130 with crank arms 131 fixed to the respective cam shafts 121.

Through the medium of the linkage above described, the brakes on the intermediate shafts may be engaged by pulling back the hand lever 123. It will be observed that the link 126 is bent intermediate its ends to present a relatively shallow V-shaped configuration. This permits the connection between the link and the hand lever to pass over the pivot axis of the lever and thus constitute an over-center lock for the brake linkage. The use of locking pawls or the like is thus avoided and efficient, reliable locking is effected by the simple mechanism shown.

It will be apparent from the foregoing that the invention provides a drive transmission and steering mechanism of novel and advantageous construction for self-propelled agricultural implements or vehicles. The drive mechanism utilizes simple V-belts and pulleys instead of gears which materially reduces its weight and cost. It is to be particularly noted that by reason of its novel construction the improved drive transmission requires only two belts and yet provides forward, neutral and reverse control as well as effective steering. Furthermore, the transmission units themselves are greatly simplified which makes them more reliable and facilitates maintenance. In general, the novel controls provided by the invention make it much easier and more convenient for the driver to operate the implement and particularly facilitates the starting, stopping and steering of the implement.

I claim as my invention:

1. Combined driving and steering means for a self-propelled vehicle having a pair of axles, and ground wheels mounted to said axles comprising, in combination, a continuously driven main shaft, an independent drive connection from the main shaft to the respective axles, each said drive connection including a pair of adjustable sheave V-pulleys fixed to and rotatable with the main shaft, a V-pulley connected to drive each axle, an idler pulley, a single endless V-belt trained over said axle pulley and said idler pulley and having its opposite reaches trained over the respective adjustable pulleys, means for adjusting each pair of V-pulleys to drivingly engage one pulley with the belt and simultaneously disengage the other pulley with the belt, and control means for operating the adjusting means for both pairs of adjustable V-pulleys in unison.

2. Combined driving and steering means for a self-propelled vehicle having a pair of independently mounted ground wheels comprising, in combination, a continuously driven main shaft, a pair of intermediate shafts supported in parallel relation to said drive shaft, means providing driving connections from said intermediate shafts to the respective ground wheels of the vehicle, an independent drive connection from the main shaft to the respective intermediate shafts, each said drive connection including a pair of adjustable sheave V-pulleys fixed to and rotatable with the main shaft a V-pulley connected to drive each intermediate shaft, an idler pulley, a single endless V-belt trained over said intermediate shaft drive pulley and said idler pulley and having its opposite reaches trained over the respective adjustable pulleys, and unitary control means for adjusting each pair of V-pulleys to drivingly engage either pulley of the pair with the reach of the belt trained over it while disengaging the other pulley of the pair from the belt to determine the direction of rotation imparted to the intermediate shaft through the belt.

3. In a vehicle having wheels at opposite sides supported for independent rotation, driving means for each wheel including a transmission adjustable to vary both the speed and direction of the drive, a column mounted on the vehicle for pivoting movement about a transverse axis, and linkages connecting said column with said transmission operative when the column is in a neutral position to adjust both transmissions so as to interrupt the drives for both wheels, said linkage adjusting both transmissions simultaneously to drive the wheels in a direction to move the vehicle forwardly at a speed determined by the amount of movement of said column in one direction from the neutral position and to adjust both transmissions simultaneously to drive the wheels in a direction to move the vehicle backwardly at a speed determined by the amount of movement of said column in the other direction from the neutral position, a hand wheel rotatably mounted on said column, and an auxiliary linkage operatively connecting said hand wheel with said first mentioned linkages operative to change the column effected adjustments of said transmissions to interrupt the drive to one of the vehicle wheels and thereby effect a change in the direction of movement of the vehicle both forwardly, and in the reverse direction.

4. In a motor vehicle having a pair of power driven traction devices, one at each side thereof, and individually variable power transmissions for each device, the combination of a pair of spaced control members, one for each transmission, and each movable in a direction generally toward and away from the other for varying the speed of the corresponding traction device, a manually operable adjusting means arranged to swing both in a direction parallel to the motion of said control members and in a direction perpendicular thereto and mounted at a location intermediate the control members but out of alinement therewith and a pair of links connecting the adjusting means with the control members, the links being arranged at an obtuse angle with respect to each other whereby motion of the adjusting means in said parallel direction will shift both control members toward a single side of the vehicle to produce opposite speed changes respectively in the power transmissions and consequent turning of the vehicle and whereby motion of the adjusting means in said perpendicular direction will alter the angle between the links to shift the control members toward or away from each other to vary the speed of both traction devices concurrently.

References Cited by the Examiner

UNITED STATES PATENTS

| | | | |
|---|---|---|---|
| 1,344,366 | 6/20 | Wickersham | 180—6.7 X |
| 1,356,680 | 10/20 | Wickersham | 180—6.7 X |
| 1,567,603 | 12/25 | King | 180—77 |
| 2,145,188 | 1/39 | Morris | 180—6.2 |
| 2,329,372 | 9/43 | Hitch | 180—6.2 |
| 2,745,506 | 5/56 | McCallum | 180—77 |
| 2,869,317 | 1/59 | Schurr et al. | 74—220 X |
| 2,878,690 | 3/59 | Capron et al. | 180—70 X |
| 2,879,857 | 3/59 | Kreiss | 180—6.2 |
| 2,924,982 | 2/60 | Harrer | 74—220 |
| 2,924,993 | 2/60 | White | 180—6.66 X |
| 2,924,994 | 2/60 | Adee | 74—722 |
| 2,930,246 | 3/60 | Johnson et al. | 74—220 |
| 2,941,609 | 6/60 | Bowers et al. | 180—6.48 |

FOREIGN PATENTS

| | | |
|---|---|---|
| 595,089 | 3/60 | Canada. |
| 580,060 | 8/46 | Great Britain. |

A. HARRY LEVY, *Primary Examiner.*

BENJAMIN HERSH, *Examiner.*